Dec. 24, 1929.         G. H. KOCH         1,740,656
                     FLEXIBLE GEAR WHEEL
                     Filed Feb. 1, 1928

INVENTOR
Gustav H. Koch.
BY Wesley G. Carr
ATTORNEY

Patented Dec. 24, 1929

1,740,656

UNITED STATES PATENT OFFICE

GUSTAV H. KOCH, OF WILKINSBURG, PENNSYLVANIA, ASSIGNOR TO WESTINGHOUSE ELECTRIC & MANUFACTURING COMPANY, A CORPORATION OF PENNSYLVANIA

FLEXIBLE GEAR WHEEL

Application filed February 1, 1928. Serial No. 251,041.

My invention relates generally to gear wheels and particularly to gear wheels that are provided with flexible elements to permit resilient annular displacement of the gear rim relative to the hub structure.

It is among the objects of my invention to provide a flexible gear wheel of compact and durable construction that is adapted to operate under conditions of misalinement and shock, such as are encountered in electrically-driven railway vehicles.

Another object of my invention is to provide a flexible gear-wheel having cooperating lug members and spring elements that are so shaped that the radial and tangential components of the pressure exerted through the end of the spring are completely balanced by the radial and tangential reactions of the lug members.

It is also an object of my invention to provide a flexible gear wheel in which the resilient elements are disposed to engage and disengage lug members on the center and rim portions without undue friction or wear.

My present invention is directed to a flexible gear wheel comprising a hub or center portion and a gear-rim portion mounted for universal movement on the hub portion. In order to transmit torque between the hub and the rim portion, resilient elements are provided in the form of spring members, each having substantially the shape of an annulus with a small section removed to provide faces for engaging the hub and the gear-rim portions.

The faces or ends of the resilient elements are so shaped that, when no torque is being transmitted, they will engage both the hub and the rim portion and, when torque is being transmitted, one end will engage the hub portion only and the other end will engage the rim portion only.

Figure 1:
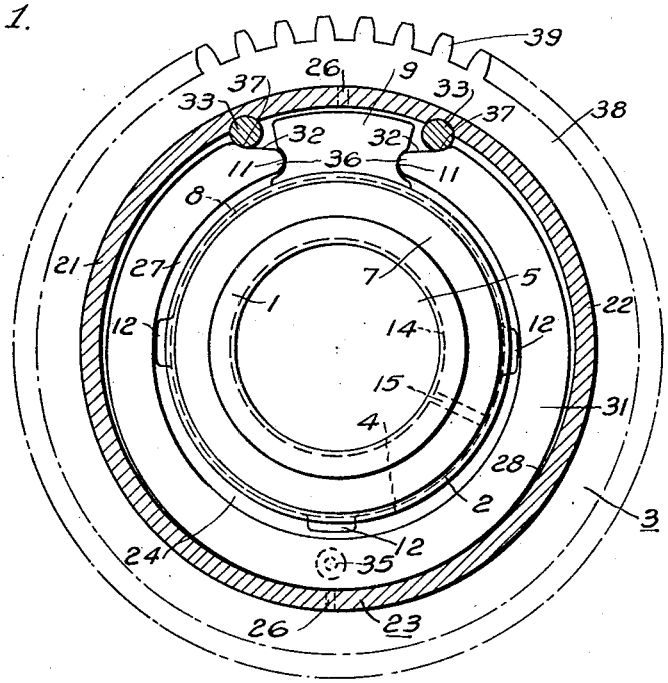
Figure 2:
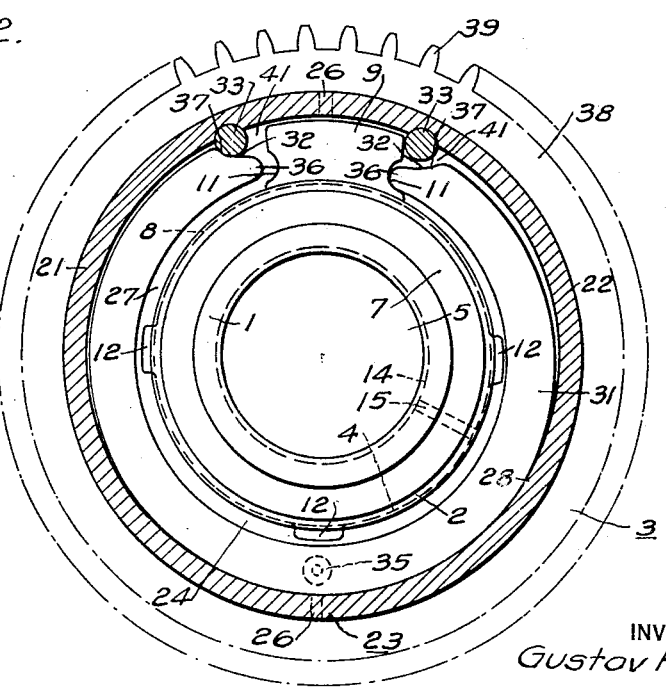

A clearer understanding of the nature and objects of the invention may be had by reading the following detailed description, in conjunction with the accompanying drawing, in which;

Figure 1 is a view, in cross-section, of a flexible gear-wheel embodying my invention, and Fig. 2 is a similar view of the gear wheel as it appears while transmitting torque.

Referring to the drawing, the flexible gear wheel illustrated comprises a gear center or hub 1 that is provided with spherically curved peripheral seating portions 2 that constitute bearing surfaces upon which a composite gear rim 3, having complementary spherically curved seating portions 4, is mounted. The gear center 1 is provided with a centrally disposed opening 5 for receiving a shaft (not shown) such as the axle shaft of a railway truck.

As shown in the drawing, the spherical periphery or seating portions 2 of the hub 1 are disposed adjacent to the end faces 7 of the hub. Between the spherical bearing surfaces 2, a groove or channel 8 is provided for a purpose to be hereinafter explained. From the bottom of the channel 8, a lug 9, that is preferably an integral part of the hub 1, extends radially outward. As illustrated, the lug 9 is provided with concave faces 11 to adapt it to be engaged by resilient members that will be described hereinafter. At uniformly spaced intervals about the periphery of the hub 1, relatively short lugs or stop members 12 extend radially from the channel 8. An annular groove 14 is provided in the inner surface of the hub 1 within the opening 5 to serve as a means for collecting lubricant that may be conveyed through a passageway 15 to the channel 8.

The gear rim 3 comprises a pair of cooperating side plates 21 and 22 that together constitute an annular retaining ring 23 of U-shape in cross section having inwardly extending flanges or side plates 24 that are provided with the spherically-shaped bearing surfaces 4 for engaging the bearing surfaces 2 on the gear center 1. Each of the side plates 21 and 22 constitutes a segment of the retaining ring 23 and are connected by dovetail joints 26.

The retaining ring 23, when in position on the hub 1, is disposed relative to the channel 8 to provide a chamber 27. A plurality of spring members 31 are disposed in side-by-side relation in the chamber 27 and serve to connect the hub 1 to the gear rim 3. Each of the spring elements 31 is of substantially the shape of an annulus, a small segment of which is removed to provide faces 32 having convex portions 36 and concave portions 37 that are adapted to engage the concave faces 11 of the lug 9 and the convex surfaces of stop pins 33, respectively.

The stop pins 33 are disposed within the side plates 21 and 22 and spaced from each other by a distance somewhat greater than the width of the lug 9, as shown in Fig. 1.

When the gear wheel is in its neutral position, that is, when it is not transmitting torque, the convex portions 36 of the spring ends 32 engage the concave face 11 of the lug 9, and the concave portions 37 engage the stop pins 33 in the rim 3, as shown in Fig. 1. However, when the torque is being transmitted in either direction, one spring end 32 engages the lug 9 only and the other spring end engages one of the stop pins 33, as shown in Fig. 2. The spring elements 31 are adapted to bear against the inner face 28 of the retaining ring 23 at a point midway between their ends. In order that the spring elements 31 may be properly located within the chamber, spacing members 35 are provided in the side walls 24 of the side plate 23. The chamber 27 further provides a storage space for lubricant that may be introduced into it through the channel 15. The two segmental side plates 21 and 22 are secured in their proper operating positions by means of a band or ring 38 that may be pressed or shrunk thereon to complete the gear rim 3. The band 38 is provided with gear teeth 39 for engaging a cooperating pinion (not shown).

The stop members 12 on the gear center 1 extend radially between the side plates 24 and serve to limit the lateral displacement of the rim 3 relative to the hub 1. In order that the circumferential displacement of the rim 3 relative to the hub 1 may not exceed a predetermined amount, the clearance space 41 that is provided between the lug 9 and the stop pins 33 may be limited in size to permit only the desired displacement.

In operation, when torque is transmitted from the gear rim 3 to the gear center 1, one of the stop pins 33 exerts a force upon one end 32 of the spring elements 31, thereby setting up compressive and bending stresses within them. The other end of the spring elements 31 engages one concave face 11 of the lug member 9 and exerts a force against it that tends to turn the gear center 1.

This action is clearly shown in Fig. 2 of the drawing wherein the gear wheel is represented as transmitting torque. It will be observed that the spring ends 32 bear upon only the lug 9 or the stop pin 33 while torque is being transmitted and that they do not touch the portions of the gear wheel that are disposed to move relative to the spring ends.

Therefore, there is no rubbing or abrasive action between the spring ends and the gear rim or the center portion.

The spring elements 31 are gradually deflected, under the load imposed by the stop pin 33, in such manner that they tend to conform to the inner surface 28 of the gear rim 3, as more fully described in the copending application of Claude Bethel, Serial No. 208,712 filed July 27, 1927 and assigned to the Westinghouse Electric & Manufacturing Co.

It is evident from the foregoing explanation of my invention that a flexible gear wheel made in accordance therewith provides a compact and durable structure that is adapted to be used where space is limited and where conditions of misalinement and torsional vibrations between the driven and driving shafts are encountered.

Further, it is evident that springs and lug members constructed in accordance with my invention provide means for utilizing the spring material in a flexible gear wheel to the best advantage and prevent injurious friction and abrasive action between the spring elements and the other portions of the gear wheel.

Although I have described a specific embodiment of my invention, it will be obvious to those skilled in the art that various modifications may be made in the details of construction and in the arrangement and relation of the several cooperating parts without departing from the spirit and scope of my invention, as defined in the appended claims.

I claim as my invention:

1. A gear element comprising a hub, a rim carried by the hub, lugs on the hub and on the rim and a spring member for transmitting torque between the hub and the rim said spring member having bearing surfaces at its ends for engaging the lugs, the bearing surfaces being so shaped that they are disposed to engage and disengage the lugs on the rim and the hub without appreciable sliding contact.

2. A flexible gear wheel comprising a hub, a rim carried by the hub and an arc shaped spring interposed between the hub and the rim for transmitting torque, said spring member being provided with bearing surfaces at its ends for engaging either the hub or the rim without frictional action therebetween.

3. A gear wheel comprising a hub, a rim carried by the hub, said hub being provided with a radially extending lug having a pair of concave bearing surfaces, and said rim being provided with lugs having convex bearing surfaces, and a spring member simulating a section of an annular member, said spring member having convex and concave bearing surfaces on its ends for engaging the lugs on the hub and the rim.

4. A gear wheel comprising a hub having a radially projecting lug, a rim carried by the hub and having cooperating lugs and a spring element having substantially the shape of an annulus with a portion removed, the ends of said spring element being shaped and disposed to engage and disengage the lugs on the rim and the hub without sliding contact therewith.

5. A flexible wheel comprising a hub, a rim carried by the hub, said hub and rim being provided with cooperating lugs, and a spring element having the shape of an annulus with a sector removed, the ends of the spring having bearing surfaces for engaging the lugs, said bearing surfaces being shaped to engage the lugs on the hub or the rim in such manner that both the radial and tangential forces of the spring are resisted by the lugs.

6. A spring system comprising a spring member having the shape of an annulus with a sector removed and cooperating lugs disposed between the ends of the spring member in such manner that they are free to move relative to each other to expand the spring member, the ends of the spring member being shaped to engage either lug positively and without appreciable sliding contact.

7. A flexible gear-wheel comprising a center portion, a rim portion carried by the center portion, a spring element for transmitting torque between the center and the rim portions and means on the center and rim portions for engaging the ends of the spring element, said engaging means and said spring each being shaped so that, when no torque is being transmitted, both spring ends will engage both the center and the rim portions and, when torque is being transmitted in either direction, one spring end will engage the center portion only and the other spring end will engage the rim portion only.

8. A flexible gear-wheel comprising a center portion, a rim portion carried by the center portion, an annular spring element having an outer radius smaller than the inner radius of the gear rim disposed between the center and the rim portions and means on the center and the rim portions for engaging the ends of the spring element, the ends of the spring element being so shaped that, when torque is being transmitted in one direction, one end of the spring will engage the rim without having contact with the center portion and the other end will engage the center portion without having contact with the rim portion and, when no torque is being transmitted, both ends of the spring will engage both the center and the rim portions and, when torque is being transmitted in the opposite direction, the opposite ends of the spring will engage the center and the rim portions, respectively.

9. In a flexible gear wheel, in combination, a hub having an outwardly projecting lug, a rim carried by the hub and having inwardly projecting lugs, and a spring element both ends of which are adapted to engage the lugs on the hub and the rim, one portion of the ends of said spring being so shaped that it is adapted to engage the lug on the hub without touching the rim and another portion of the spring ends being so shaped that it is adapted to engage a lug on the rim without touching the hub when torque is being transmitted by the gear wheel.

10. A flexible gear wheel, comprising, in combination, a hub, a rim carried by the hub, a spring member interposed between the hub and the rim for transmitting torque, the hub and the rim being respectively provided with members for engaging both ends of the spring member, said spring member being disposed to engage all of said members carried by hub and rim when the gear wheel is in its neutral position, the ends of said spring and lugs being shaped to effect, when torque is transmitted, the disconnection of one spring end from the rim and the other from the hub, simultaneously with the beginning of relative movement of the rim and hub to prevent a wiping action between the spring and said members carried by the rim and hub which are inactive in the transmission of the torque, said spring being capable of distortion to permit relative movement of the rim and the hub and give resilience to the gear wheel.

In testimony whereof, I have hereunto subscribed my name this 24th day of January, 1928.

GUSTAV H. KOCH.